United States Patent [19]
Lee

[11] Patent Number: 4,927,645
[45] Date of Patent: May 22, 1990

[54] PROCESS FOR MAKING CANDY COATED SNACK FOODS SUCH AS POPCORN

[75] Inventor: Yanien Lee, Manlius, N.Y.

[73] Assignee: Borden, Inc., Columbus, Ohio

[21] Appl. No.: 313,048

[22] Filed: Feb. 21, 1989

Related U.S. Application Data

[63] Continuation-in-part of Ser. No. 909,485, Sep. 19, 1986, abandoned.

[51] Int. Cl.$^5$ .............................................. A23G 3/00
[52] U.S. Cl. ...................................... 426/93; 426/103; 426/613; 426/660; 426/307; 426/241
[58] Field of Search ............... 426/660, 307, 613, 103, 426/93, 241

[56] References Cited

U.S. PATENT DOCUMENTS

| | | |
|---|---|---|
| 2,181,109 | 11/1939 | Dodge . |
| 2,196,395 | 4/1940 | Kellogg . |
| 2,451,096 | 10/1948 | Kooman . |
| 2,689,796 | 9/1954 | Massmann et al. . |
| 2,868,647 | 1/1959 | Vollink . |
| 3,094,947 | 6/1963 | Green et al. .......................... 426/307 |
| 3,184,316 | 5/1965 | Doan et al. . |
| 3,294,039 | 12/1966 | Ogden . |
| 3,582,336 | 6/1971 | Rasmusson . |
| 3,617,309 | 11/1971 | Rebane . |
| 3,647,474 | 3/1972 | Dame, Jr. et al. . |
| 3,656,971 | 4/1972 | Reimer ................................. 426/570 |
| 3,682,651 | 8/1972 | McAlister . |
| 3,704,133 | 11/1972 | Kracauer . |
| 3,792,183 | 2/1974 | Lyall et al. . |
| 3,826,857 | 7/1974 | Horn . |
| 3,840,685 | 10/1974 | Lyall et al. ........................... 426/307 |
| 3,882,255 | 5/1975 | Gorham, Jr. et al. . |
| 3,950,567 | 4/1976 | Tomlinson . |
| 3,955,003 | 5/1976 | Loos ..................................... 426/305 |
| 3,961,091 | 6/1976 | Caccavale et al. . |
| 4,158,064 | 6/1979 | Banowitz . |
| 4,219,573 | 8/1980 | Borek ................................... 426/107 |
| 4,409,250 | 10/1983 | Van Hulle et al. . |
| 4,596,713 | 6/1986 | Burdette . |

FOREIGN PATENT DOCUMENTS

| | | |
|---|---|---|
| 839655 | 4/1970 | Canada . |
| 55-159758 | 12/1980 | Japan . |
| 60-210959 | 10/1985 | Japan . |
| 79/00494 | 8/1979 | PCT Int'l Appl. . |
| 1247639 | 9/1971 | United Kingdom . |

*Primary Examiner*—Jeanette Hunter
*Attorney, Agent, or Firm*—Venable, Baetjer, Howard & Civiletti

[57] ABSTRACT

A process for making candy coated snack foods comprising popping corn kernels in a microwave oven and melting a candy bar of specified formulation and dimension over the popped corn. Specific moisture, shortening and emulsifier content assure satisfactory melt characteristics of the candy bar when subjected to microwave heating.

17 Claims, No Drawings

PROCESS FOR MAKING CANDY COATED SNACK FOODS SUCH AS POPCORN

RELATED APPLICATIONS

This is a continuation-in-part of U.S. patent application Ser. No. 909,485, filed September 19, 1986, now abandoned.

BACKGROUND OF THE INVENTION

Candy coated popcorn products are popular with the consuming public. They maybe bought in ready-to-eat form or may be prepared by the consumer in the home.

There are a variety of methods for preparing a coated popcorn product. One method is to melt a candy coating substance or glaze and pour the melt over popped corn. The popped corn used in this method may be produced by subjecting corn kernels to hot air popping, cooking in oil, or microwave energy.

Another method of producing coated popcorn is to combine the popcorn kernels in a cooking medium together with a flavoring substance. The ingredients are then heated, and as the popcorn kernels pop, they are coated with the flavoring substance.

Other products, such as candy coated farinaceous dough products, are produced by subjecting a suspension of the puffable farinaceous dough pieces in a coating medium, all of which is packaged in an expandable bag, to microwave energy. When microwave energy is directed at the bag, the dough pieces expand and the heated coating medium coats such puffed dough pieces.

In the candy and snack food industry, the candy coatings, such as caramel coatings, for use on popcorn, cereal, and the like, are prepared by cooking a candy syrup at 290° F. to 310° F., until the syrup contains only about 2% moisture by weight. The moisture content of the cooked syrup depends on several factors, including cooking temperature, barometric pressure, relative humidity, and the nature of the ingredients used in the syrup. Thus the presence of either invert sugar or corn syrup or both, as ingredients in a particular formulation for a candy syrup, will tend to increase the moisture content of a cooked syrup, for a given maximum cooking temperature.

Candy coated popcorn begins caking and sticking when the moisture content of the candy coating exceeds about 3% by weight at room temperature. Thus it is considered that the candy syrup that is used for coating popcorn, such as caramel coated popcorn, should normally be cooked to a final moisture content of about 2%, in order that the product have and retain crispness, and also enjoy a reasonable shelf life.

SUMMARY OF THE INVENTION

The present invention in one aspect is a process for producing candy coated snack foods such as popcorn. This process comprises, in one preferred embodiment, the steps of: applying microwave energy to popcorn kernels in order to pop such kernels; placing a meltable bar of candy atop the popped corn; applying microwave energy to the popped corn with the candy bar atop it; and mixing the melted candy with the popped corn.

The popcorn kernels are supplied in a container that is penetrable by microwave energy. After the kernels have been popped, they are transferred to a bowl that is microwave safe. Atop the popcorn in the bowl is placed the bar of meltable candy.

In another aspect, the present invention resides in a candy bar that can be melted in a microwave oven to form a pourable composition that is useful as a coating. While this coating is useful for applying a candy-type coating to popcorn, the melted candy can also be used to coat breakfast cereal, roasted nuts, extruded snack foods, and the like.

The candy bar is a solidified emulsion made of sugar, shortening, water, and an edible emulsifying agent. The amount of water present in the bar is in the range from about 2% to about 10% by weight of the bar. The amount of edible emulsifying agent is sufficient to inhibit the separation of the shortening from the emulsion, as the emulsion is cooled and hardened to form the bar. The amount of shortening is sufficient to promote more uniform melting of the candy bar, especially when the melting is done in a microwave oven.

The composition and physical characteristics of the candy bar are such that the bar will melt without scorching, sufficiently coat the popped corn when melted, and will not break in its package before being placed atop the popped corn. The physical dimensions of the meltable candy bar, along with specific percentages of moisture, shortening and lecithin in its composition assure the desired melt characteristics of the candy bar when subjected to microwave energy.

The composition of the candy bar and the process of making the coated popcorn product also assure a final product with desirable organoleptic properties.

DETAILED DESCRIPTION OF THE INVENTION

In this specification, the term "sugar", when used alone, is used to refer to sucrose. The sucrose may be in any of its common forms, including granulated sugar, invert sugar, or those high solids solutions of sugar and water referred to in the sweetener trade as "liquid sugar". The sucrose also may be in the form of brown sugar, or in any other convenient, available, edible form.

The term "corn syrup" is used to refer to a partial hydrolysate of starch. Those corn syrups that are useful in the practice of the present invention are described in detail in this specification. The term is intended, as used herein, to embrace not only those syrups that are generally called in the trade, glucose syrups, but also all other partial hydrolysates of starch including high fructose corn syrups. This same term "corn syrup" is also intended to embrace corn syrup solids. Generally the term "corn syrup solids" is used to refer to a solidified high D.E. corn syrup whose sugar content consists predominantly of dextrose. When reference is made to "dextrose", the reference is intended to mean the pure, crystalline solid that is obtained from the complete hydrolysis, concentration and purification of corn starch hydrolysates. Corn syrup solids are produced by removing the moisture from a corn syrup.

The term "D.E." refers to dextrose equivalent, which is a measure of the reducing-sugar content of a corn syrup, calculated as anhydrous dextrose and expressed as a percentage of the total dry substance in the syrup. In the commercial world, it is common to refer to "corn syrup" only in connection with corn starch hydrolysates having a dextrose equivalent in the range from about 28 to about 68.

The term "shortening" is used in this specification to refer to edible fats and edible oils, such as would be useful in preparing candy bars in accordance with one preferred embodiment of the invention.

The invention comprises a method of making a coated popcorn product. This method is in one aspect a two step process that utilizes microwave energy in each of the two steps.

Popcorn kernels and optionally, oil or fat, are packaged in a container which can be penetrated by microwave energy. The container is preferably a paper bag. The paper bag has a volume such that it is capable of holding the entire volume of popcorn after it has been popped.

The amount of popcorn kernels in a bag is preferably from about 45 grams to about 56 grams, but may be more or less, as desired for commercial and packaging purposes. These amounts of popcorn kernels yield about six cups to eight cups of popped corn, respectively.

The amount of oil or fat used is sufficient to produce a pleasant tasting, light, nonoily popped corn product. Oil or fat is also used to prevent moisture loss from popped corn. The amount of oil or fat used is preferably approximately 9 grams with 45 grams or less of popcorn kernels and approximately 11 grams with 45 to 56 grams of popcorn kernels.

The microwave container of popcorn kernels, optionally with added oil or fat, is placed in a microwave oven. Any microwave oven with the ability to produce energy in the 915 MHz to 2450 MHz range, and the capacity to hold the container with the popped corn, will suffice.

After the corn kernels have been popped, a process which takes approximately four to eight minutes in a conventional microwave oven such as is found in many homes, the container holding the popped corn is removed from the oven. Following removal from the oven, the container is opened and the popped corn is poured into a bowl of sufficient volume to hold the contents from the container. Unpopped kernels should be removed. The bowl should be constructed of a material which is safe for use in a microwave oven. Glass and ceramic are examples of two suitable materials for the bowl.

Once the popped corn has been placed in the bowl a meltable candy bar, prepared in accordance with the present invention, is placed on top of the popped corn. The bowl is then placed in the microwave oven and the contents are subjected to microwave heating for approximately 2 to 4 minutes. At the end of this time, the candy bar has been melted, and the bowl is then removed from the microwave oven. After removal from the microwave oven, the contents of the bowl are mixed so that the melted candy coats the popcorn.

In a preferred embodiment, nuts or sesame seeds and sunflower seeds (commonly referred to as granola) may be added to the popped corn and melted candy before mixing. In these embodiments, the popcorn and the nuts or granola are coated with the candy melt during mixing. The nuts used are preferably peanuts although any type of nut would be acceptable. In another embodiment, the nuts or granola are incorporated in the candy bar.

The candy bar may be formulated to provide a variety of flavors; however a caramel flavor is popular and is preferred for that reason. The candy bar requires a certain moisture content in order to melt in the microwave oven. The candy bar must not only melt, but it must melt within a short enough time to prevent the popcorn from becoming overcooked and therefore unpalatable. A moisture content of 2% to 10%, by weight, in the candy bar assures that the candy will melt sufficiently rapidly, without causing the popped corn to overcook. A moisture content of 4% to 5% by weight of the bar, or 5% to 6.5% on a sugar solids basis, is the preferred moisture content for the candy.

The moisture content of the candy is important because of the method by which microwave energy heats or cooks food products. Microwave heating employed in food processing or preparation at 915 MHz and 2450 MHz is a result of interactions of the chemical constituents of foods with an electromagnetic field. These interactions lead to instantaneous heat generation within the product due to molecular friction, primarily by the disruption of weak hydrogen bonds associated with the dipole rotation of free water molecules and with electrophoretic migration of free salts in an electrical field of rapid changing polarity. The electromagnetic field induces orientation of the dipole of the water molecule by rotating the dipole in a direction opposite to the polarity of the electromagnetic field. This mechanism is known as orientation polarization. When the water molecule rotates, molecular friction generates heat.

To some extent, when water molecules or ions are bound by chemical constituents such as proteins or carbohydrates, they are dielectrically less active, depending on the nature of the binding interactions and the bonding strength. It is known that free water and disassociated ions in food systems have higher dielectric activity and more easily undergo this "orientation polarization" than bound water and associated ions.

Thus, not all of the water present in any particular food composition, including a candy bar prepared in accordance with the present invention, is in a free state; some of it may be bound or partially bound. The degree to which water is bound in a food composition is characterized by the "water activity" or equilibrium relative humidity (E.R.H.) of the food composition. By definition, the water activity is in a range of values from 0.00 to 1.00. The water activity of a candy bar, prepared in accordance with the present invention, generally will be in the range from about 0.30 to about 0.60. Superior results in terms of storage stability are obtained when the water activity of the candy bar is in the range from about 0.30 to about 0.40.

The water activity in the candy bar of the present invention is generally very low. It is influenced by the moisture content of the candy bar, since higher moisture contents tend to be reflected by higher water activities. The water activity of the candy bar tends to be at a low level when the solids reflect a very high content of sugar, since sugars generally have higher water binding capacities than equivalent amounts of starches, for example. Thus the water activity values are primarily controlled by the contents of sugars of all kinds, including sucrose, corn sugars, and corn syrups. The techniques for measuring water activity are well known.

Food constituents are generally classified as moisture, fat, carbohydrate and ash content. Except for moisture and ash content, the remaining constituents are relatively inert at the microwave frequencies that are of interest for food processing. It is thus apparent that the presence of moisture in a food system will facilitate microwave heating and cause an even and uniform heat distribution in the food system.

In order to achieve the proper moisture content (2% to 10% by weight, and preferably 4% to 5% by weight) in the candy bar, a mixed syrup containing corn syrup, sugar, molasses, shortening, lecithin, salt, at about 13% moisture content, is cooked in a steam jacketed kettle until a temperature of 300° F. is reached, at about 30 inches Hg of barometric pressure, so that the moisture of the syrup drops to about 2%. The syrup is then cooled to 240° F. or below, and sufficient water is added, if necessary, to adjust the final moisture content of the syrup to between 2% and 10% by weight. The cooked syrup is then poured into a rectangular mold, and a hardened, rectangular candy bar is produced. The bar may weigh about 100 grams or about 150 grams for six cup and eight cup portions of popped corn respectively. Although a candy bar of any weight may be produced, the 100 gram bar and 150 gram bar are preferred.

In another embodiment, the same ingredients of a mixed syrup are cooked in a steam jacketed kettle until a temperature of about 265° F. to 270° is inches Hg of barometric pressure, the moisture of the syrup is about 5%, and therefore the syrup may be poured directly into the rectangular mold without the need to cool such syrup and add water.

The ease of melting the candy is increased, and the tendency to scorch the candy is decreased, when the moisture content in the candy is increased, while remaining in the range from 2% to 10% of the bar by weight. The optimum moisture content of the candy bar is in the 4% to 5% by weight range. This range is equivalent to a moisture level of 5% to 6.5% on a sugar solids basis. At this optimum moisture level, more than 90% of the surface area of the candy bar can be softened and melted within the first 1.5 minutes that the candy bar is subjected to microwave energy.

Although the optimum moisture content for the candy bar is 4% to 5% by weight, the optimum moisture content for the coating of the final coated popcorn product is approximately 2% by weight. This moisture content is necessary to assure that the final coated product has the same crispness and appearance as regular ready-to-eat candy coated popcorn. Ready-to-eat candy coated popcorn has a moisture content of approximately 1.21% to 2.29% by weight. The 2% moisture content for the coating of the final product is assured by a final microwave heating step in which six to eight cups of the popped corn, which has had the candy melt stirred into it, is heated in the microwave oven for 30 to 60 seconds. This final microwave heating step reduces the moisture content of the coating from about 5% to about 2% by weight.

The candy bar is preferably formed in the shape of a flat plate. As a flat plate, the candy bar has a substantially uniform thickness. However, the thickness between different candy bars will be varied according to the amount of popped corn to be candy coated. For instance, a candy bar used to coat six cups or less of popped corn will be about 0.25±0.0625 inch thick; a candy bar used to coat between six and eight cups of popped corn will be about 0.375±0.0625 inch thick; and a candy bar used to coat eight cups or more of popped corn will be about 0.5±0.125 inch thick.

The thickness between candy bars varies due to the amount of candy necessary to coat different volumes of popped corn (e.g., more candy is necessary to adequately coat eight cups of popped corn than is necessary to coat six cups of popped corn). The amount of candy necessary for adequate coating generally varies arithmetically with the volume of popped corn. From about four cups to about 10 cups of popped corn, the size of the candy bar necessary to coat popped corn varies by about 25 grams for every additional cup of popcorn. That is, a candy bar weighing about 50 grams will adequately coat about 4 cups of popped corn, a 75 gram candy bar will adequately coat about 5 cups of popped corn, a 100 gram candy ball will coat about 6 cups of popped corn, etc. The outer volume limits of 4 cups and 10 cups are chosen because these are about the minimum and maximum volumes of popped corn which are commonly prepared by consumers in their homes.

A further characteristic of the candy bar is that its width and length dimensions are preferably equal (i.e., a square). However, suitable candy bars may have rectangular shapes, so long as one dimension is not significantly greater than the other. In general, the length of the candy bar should not be more than about two times the width of the candy bar.

These width and length characteristics are necessary because of the pattern of microwaves in conventional microwave ovens. Conventional microwave ovens produce a wave pattern which approximates the shape of a cyclone (i.e., an increasing diameter spiral). The narrowest diameter of the microwave is at the ceiling of the oven and the widest diameter is at the floor. By approximating a square shape, the candy bar has a maximum amount of its surface intersecting the cyclone-shaped microwave.

The most common volumes of popped corn prepared by consumers in their homes are either six cups or eight cups of popped corn. The approximate dimensions of a candy bar that is useful for coating a six cup bowl of popped corn are: length, 5 inches; width, 3.5 inches; thickness, 0.25 inches; and weight, about 100 grams. The approximate dimensions of a meltable candy bar for an eight cup bowl of popped corn are: length, 6 inches; width, 4.5 inches; thickness, ⅜ inch, and weight, about 150 grams. These approximate dimensions give the candy bar certain desirable physical characteristics. The selected dimensions facilitate proper melting of the candy in the microwave oven. The physical dimensions of the candy bar contribute to proper melting characteristics because the larger the surface area of the candy bar, the more uniform is the melting of the bar. As the thickness of the bar is decreased, the surface area increases and therefore the melting of the bar becomes more uniform.

The dimensions of the candy bar are selected not only to assure that the candy melts uniformly, but also to assure that it will not easily break when stored in its package. The ease of melting the candy bar increases as the thickness of the bar decreases. However, too thin a bar will result in a high incidence of breakage in the package, and this is undesirable, since a bar which has broken into pieces is more difficult for the consumer to use.

A further reason for the selection of these approximate dimensions for the candy bar is to assure that the melted candy bar will be present in sufficient amount to adequately coat the selected quantity of popped corn, i.e., for example, either a six cup or an eight cup portion.

The coating must be such that the popped corn is adequately flavored, but not overly so. If overcoated, the popcorn product will not only be unpalatable, but it will also tend to be overly sticky and therefore form clusters. The unpalatability results not only from a flavor that is too strong, but also from either an overcooked and/or soggy popcorn product.

The use of a candy bar that produces a greater quantity of syrup than is necessary to coat the amount of popped corn will result in a soggy popcorn product. An example of such a situation would be the use of a 200 gram candy bar to coat a six cup bowl of popped corn (according to the invention, a 100 gram candy bar should be used to coat six cups of popped corn). The soggy resultant product occurs because of a greater amount of moisture and sugar in the heavier candy bar. The six cups of popped corn is not sufficient to absorb the excess moisture of a 200 gram candy bar and still remain crispy. The greater amount of sugar in a 200 gram candy bar causes a soggy product, because sugar is hygroscopic and therefore absorbs moisture from the air and transfers the moisture to the popped corn. The disadvantage of a soggy popcorn product can be rectified by increasing the time the product is subjected to microwave energy, or by applying the microwave energy intermittently and stirring the popcorn between applications of microwave energy.

The candy coated popcorn product is also unpalatable if the candy bar produces a quantity of syrup insufficient to properly coat the popped corn. An example of such a situation would be the use of a 50 gram candy bar to coat an eight cup bowl of popped corn (according to the invention, a 150 gram candy bar should be used to coat eight cups of popped corn.) The use of a lighter candy bar results in a product that is scorched. Scorching results because the popcorn and candy coating are subjected to more microwave energy than is necessary to melt the candy bar. If the candy bar is lighter than that recommended for use in the present invention, then less microwave energy should be applied to melt the candy bar.

Other problems occur if the candy bar is the proper weight to coat the given quantity of popped corn, but does not conform to the dimensions of the present invention. The dimensions of the candy bar determine the surface area of the bar that is exposed to microwave energy. As a greater surface area is exposed to microwave energy, the candy bar melts at a faster rate. Therefore, if the length and/or width dimensions of the candy bar are increased, the surface area is increased, and the candy bar absorbs more microwave energy. The absorption of more microwave energy causes the candy bar to melt more rapidly and therefore result in a scorched and burned popcorn product. If less microwave heating is applied so as to prevent burning and scorching of the candy syrup, the popcorn will be undercooked.

If the surface area of the candy bar is decreased by decreasing the length or width of the bar, an insufficiently coated product will result. The candy bar will not completely melt if the surface area is decreased. If excess microwave heating is applied to complete the melting, the popcorn product will be overcooked.

In addition to the moisture content and the dimensions of the candy bar, the amount of shortening used in the formulation of the candy bar is also important. Fats and oils are relatively inert, low in dielectric activity, and have fewer hydrogen bonds than occur between water, sugar substance, and other food constituents. The presence of emulsified fat or oil in a food system, such as candy syrup, will alter the surface tension. Consequently, the candy mass retains more heated water and its vapor within the system. Through this unique characteristic, the addition of shortening in the candy will result in a more even and uniform melting during the microwave heating process.

Increasing the amount of oil or shortening in the candy bar facilitates the melting of the bar during microwave heating by making it more difficult for heated water and its vapor to escape. The retention of the heated water and vapor causes the candy to melt more uniformly than it would if there were less shortening. By causing the candy to melt at a more uniform rate than if there were no shortening or less shortening, the quantity of shortening in the candy also tends to decrease the degree of sugar scorching when the candy is melted.

The amount of shortening necessary to impart the desired properties is approximately 1% to 30% by weight of the candy bar, with a preferred percentage range being 15% to 25% by weight. In a candy bar of 100 grams, the shortening content would be in the range from about 1.0 grams to about 30.0 grams, and preferably 15.0 grams to 25.0 grams.

The incorporation of shortening in a candy bar such as the bar of the invention presents a problem in that the oil tends to "separate out" after the candy bar is cooled and hardened. "Separating out" is caused because polar water molecules and nonpolar shortening molecules lack affinity for one another in an emulsion, absent an emulsifying agent. In general, emulsifying agents have molecules with both a polar section and a nonpolar section. The problem of the oil "separating out" is overcome by the incorporation of an edible emulsifying agent, preferably lecithin, in the formulation of the candy. Other suitable edible emulsifying agents are glycerol monostearate, polyethylene oxide and sorbitan fatty esters, preferably those sold under the trademarks, SPANS ® and TWEENS ®.

Lecithin is a phospholipid and an emulsifying agent. A relatively small amount of lecithin is necessary to assure an adequately stable emulsion to prevent the shortening from "separating out". An appropriate amount of lecithin in the candy bar is about 1% to 2% by weight, a preferred amount being from about 1.5% to about 1.75% by weight, and most preferably 1.6% by weight. Other suitable edible emulsifying agents are used in the same proportions.

Corn syrup or corn syrup solids are also present in the formulation of the candy. Corn syrup does not affect the melting characteristics of the candy during microwave heating. The type of corn syrup does, however, affect the physical characteristics of both the candy bar and the coated popcorn product. Candy bars made form high fructose corn syrup are softer than those that are made with other types of corn syrup. The use of high fructose corn syrup, which has a high invert sugar content, also results in a candy bar that tends to deform at room temperature after three to four days. When a candy bar that has been made with high fructose corn syrup is melted and used to coat popped corn, the resultant popcorn product may have a chewy mouth-feel. Partly for this reason and partly because of economics, high fructose corn syrup may be, but need not be, used in the formulation of the candy bar.

One of the benefits of using corn syrup of any kind as an ingredient for making the candy is that the presence of corn syrup tends to inhibit the growth of sucrose crystals. This is particularly true of high fructose corn syrup. Another advantage may be realized from using a high maltose corn syrup, in that the high maltose corn syrups tend to pick up moisture at a much slower rate than other types of corn syrup. Thus, during long periods of storage, the candy bar should tend to pick up less moisture and resist becoming sticky at high humidity, when a high maltose corn syrup is used in place of a "regular" corn syrup.

The corn syrup used in the formulation of the candy should preferably have a Dextrose Equivalent (D.E.) in the range from about 28 to about 68. The Dextrose Equivalent of corn syrup has a direct effect on the sweetness, firmness and hygroscopicity of the candy bar. A coated popcorn product of optimum sweetness and crispness is produced with a candy coating that is made with a corn syrup that has a Dextrose Equivalent of about 52, and a solids content of about 81.5% by weight.

Granulated sugar is also an ingredient in the formulation of the candy. The granulated sugar is used for organoleptic purposes for adding sweetness and body to the candy bar and ultimately to the coated popcorn product. Additionally, a small amount of salt is also preferably included in the candy formulation in order to enhance the taste of the final coated popcorn product.

If a sugar-reduced or low calorie, dietetic product is desired, a sugar substitute may be used in place of the granulated sugar in the formulation of the candy bar. Examples of suitable sugar substitutes are aspartame, saccharin and the cyclomates. The same desirable organoleptic properties will be present in a candy bar formulated with a sugar substitute as are present in a candy bar formulation containing granulated sugar.

The invention will now be further illustrated and demonstrated by a description of several specific Examples that describe different ways in which the invention may be practiced. In these Examples and throughout this specification, all parts and percentages are by weight unless otherwise specified, and are on an as is basis unless specified as referring to solids or as being on a dry basis. Further, all temperatures are in degrees Fahrenheit unless specified as being in degrees Celsius.

A caramel flavor candy bar is manufactured using the following ingredients and the process described in Example I.

EXAMPLE I

Production of a Caramel Flavor Candy Bar Candy Ingredients

| Ingredient | Amount | |
|---|---|---|
| Granulated Sugar | 31.36% | |
| Corn Syrup, 52 D.E., 43° Be' | 35.29% | |
| Molasses, 80% total solids (TS) | 5.56% | |
| Shortening (Corn Oil) | 21.74% | |
| Water | 3.95% | |
| Lecithin | 1.44% | |
| Salt | 0.66% | |
| Total | 100.00% | (On as is, Wet Basis) |

1. Mix all of the above ingredients in a cooking pan or kettle to form a syrup.
2. Continuously cook the mixed syrup until the temperature reaches 290° F. to 295° F. (143° C. to 146° C.), and hold the syrup at this temperature for 5 minutes.
3. Start to cool the cooked syrup. When the temperature of the syrup reaches 240° F. (116° C.) or below, add water if necessary to adjust the final moisture content to 4.5% ± 0.5%.
4. Maintain the syrup temperature at 200° F. to 210° F. (93° C. to 98.9° C.).
5. Weigh 16.0 grams of roasted peanuts, place in a 3.5" × 5.0" × 0.25" bar-shaped mold, and then pour 91.0 grams of syrup over the peanuts.
6. Cool the molded syrup-peanut mixture to room temperature.
7. Take the bar of candy out of the mold and package it.

The molded bar of solidified syrup, containing the peanuts, could be considered to be a caramel-peanut bar. However, so far as is known, no one has ever made a caramel bar having the particular dimensions of this slab of candy, namely 3½ in. × 5 in. × ¼ in. Moreover, the composition is different than ordinary caramel because of its high oil content. The bar thickness of ¼ in. imparts sufficient strength for handling that would normally be expected to be encountered, and at the same time, is sufficiently shallow so as to permit the bar to be melted within a reasonable time when subjected to microwave energy.

When this bar is placed on top of approximately six cups of freshly popped corn, and melted in place on top of the corn in a microwave oven, it yields a sufficient amount of candy syrup so that upon mixing a fairly uniform coating is easily applied about the popped corn. A thicker coating can be achieved simply by reducing the quantity of popped corn used. The coated corn so produced is considered to have a highly desirable texture and a delicious taste.

Another method for manufacturing the caramel flavor candy bar is presented below in Example II.

EXAMPLE II

Two Step Microwave Products

A microwavable bag was loaded with 45.0 grams of unpopped popcorn kernels and with 8.8 grams of hydrogenated soybean oil, mp 105° F., sold under the trademark Centracote. Thus the microwavable bag contains 53.8 grams of combined unpopped popcorn kernels and oil.

A second bag was loaded with a candy bar having generally the same dimensions as those of the candy bar in Example I. The intention is to place both bags in a carton, which may also contain more pairs of bags with similar contents.

The ingredients and quantities used to form the caramel flavored candy bar in this Example are as follows:

| Ingredient | Amount |
|---|---|
| Granulated Sugar | 32.87 gm |
| Corn Syrup, 52 D.E., 43° Be', 81.5% TS | 36.98 gm |
| Molasses, 80% TS | 5.82 gm |
| Corn Oil | 17.04 gm |
| Salt | 0.69 gm |
| Centriphil "W" Lecithin | 1.50 gm |
| Total | 110.90 gm |

These ingredients are mixed and then cooked to 265° F. to 270° F. or until the syrup has about a 4.5% moisture content. At this time, 16 grams of peanuts are added to the mixture. The entire mixture is then allowed to cool in a mold, and the resulting bar is packaged.

The molded bar thus produced had dimensions of about 3.5 in. × 5 in. × 0.25 in. The bar had a moisture content of about 4.5% by weight. All of this moisture was derived from the ingredients; no water was added after the bar was cooked. The package in which the candy bar is placed need not be microwavable.

To use the contents of the carton, the customer would then remove one microwavable bag containing corn kernels and oil. This bag would be placed in a microwave oven and heated sufficiently to pop the corn kernels. Any residual unpopped corn kernels would be removed promptly. The quantity produced should be on the order of about six cups of popped corn. If the amount of popped corn is greater than this, then it is a simple matter to use only about six cups or less if desired. The popped corn is then placed in a bowl, and the candy bar is removed from its package, and placed on top of the popped corn. The volume of the popped corn is approximately six cups. Upon subjecting the bar and popcorn to microwave treatment, the bar melts and flows over the popped corn. The bowl is then removed from the microwave oven, and the contents of the bowl are stirred to form a more even coating of the candy on the popcorn. The product is a delicious caramel flavored popcorn snack food. The peanuts are of course released from the bar as it is melted, and during the mixing operation become distributed throughout the coated popcorn.

Example III, below, describes the ingredients and quantities necessary to prepare a buttercrunch flavor candy bar.

EXAMPLE III

Buttercrunch Flavored Confection Ingredients

| Granulated Sugar | 31.98 gm |
|---|---|
| Corn Syrup, 52 D.E., 43° Be', 81.5% TS | 30.50 gm |
| Baker's Butter, 81.5% TS | 7.57 gm |
| Corn Oil | 7.59 gm |
| Salt | 0.68 gm |
| Centriphil "W" Lecithin | 1.37 gm |
| Non Hygroscopic Whey, 95.5% TS | 3.65 gm |
| Butter Flavor | 0.25 gm |
| Color (Annatto #6) | 0.03 gm |
| Total | 83.62 gm |

These ingredients are mixed and then cooked to 265° F. to 270° F. or until the syrup has about a 4.5% moisture content. At this time 16 grams of peanuts are added. The entire mixture is then allowed to cool in a mold, and is packaged.

The whey serves as a source of milk solids and contributes to the nutritional content of the confection as well as to the flavor. The butter flavor combines with the oil content of the confection to impart a buttery taste. The annatto imparts a yellow, butter-like color to the molded bar and also to the melted candy coating on the popcorn which is the final product of this Example.

The molded bar thus produced had dimensions of about 5 in.×3.5 in.×0.25 in. The bar had a moisture content of about 4.5% by weight. All of this moisture was derived from the ingredients; no added water was needed. The package in which the candy bar is placed need not be microwavable.

To use the contents of a carton containing bags of popcorn and oil and bags of the candy bar of the above formulation, the popcorn and oil, in the microwavable bag, are subjected to microwave radiation until essentially all of the corn kernels have been popped. As they pop, they become coated with the oil that is also present in the bag. After they have popped, they are removed from the bag and placed in a bowl. The candy bar is then removed from its package, and placed on top of the popped corn kernels. The volume of the corn kernels is approximately six cups. Upon subjecting the bar and popcorn to microwave treatment, the bar melts and flows over the popped corn. The bowl is then removed from the microwave oven, and the contents of the bowl are stirred to form a more even coating of the candy on the popcorn. The product is a delicious buttercrunch flavored popcorn snack food. The peanuts are of course released from the bar as it is melted, and during the mixing operation become distributed throughout the coated popcorn.

EXAMPLE IV

Buttercrunch Flavored Coated Popcorn

This example describes another formulation for a buttercrunch flavored candy bar. The ingredients and quantities used are as follows:

| Ingredient List | |
|---|---|
| Granulated Sugar | 40.58 gm |
| Corn Syrup, 52 D.E., 43 Be', 81.5% TS | 40.32 gm |
| Corn Oil | 10.04 gm |
| Baker's Butter | 10.02 gm |
| Salt | 0.90 gm |
| Non Hygroscopic Sweet Whey 95.5% TS | 4.83 gm |
| Staley M Lecithin | 1.80 gm |
| Butter Flavor | 0.44 gm |
| Color (Annatto #6) | 0.05 gm |
| Total | 104.00 gm |

These ingredients are mixed and then cooked to 265° F. to 270° F. or until the syrup has about a 4.5% moisture content. The mixture is then poured into a mold and allowed to cool. When cooled, the resultant candy bar is packaged.

To use this candy bar, it preferably is packed in a carton with a microwavable bag containing 56 grams of popcorn kernels and 11 grams of Centracote 105° F. hydrogenated soybean oil. The candy bar is in a separate bag or other package in the same carton. To make a coated popcorn snack having a buttercrunch flavor, the microwavable bag containing the popcorn and fat is placed in a microwave oven and heated until substantially all of the kernels have popped. The bag is then emptied into a bowl, with any unpopped kernels being removed.

The candy bar is placed on top of the popped corn. There is a sufficient quantity of candy in this bar for coating about eight cups of popped corn by volume. The bowl, with the candy bar placed on top of the popped corn, is then placed in the microwave oven and heated. After the bar melts, the contents of the bowl are mixed, to make a more uniform coating on the popcorn. The result is a delicious confection-snack food product. The combination of Baker's butter, butter flavor, annatto, and the oil content of the candy combine to impart a delicious buttercrunch flavor.

To modify the candy bar to be suitable in amount for coating a six cup volume of popped popcorn, the oil content of the list of ingredients is reduced to 9 grams; the amounts of the other ingredients may remain the same. The amount of unpopped popcorn kernels required in the microwavable bag to produce an approximately six cup volume of popped corn is about 45 grams.

EXAMPLE V

Caramel Coated Popcorn

This example describes another formulation of a caramel flavor candy bar. The ingredients and quantities used are as follows:

| Ingredients | |
|---|---|
| Granulated Sugar | 42.26 gm |
| Corn Syrup, 52 D.E., 42 Be', 81.5% TS | 47.55 gm |
| Corn Oil | 21.92 gm |
| Molasses, 80% TS | 7.49 gm |
| Salt | 0.89 gm |
| Staley M. Lecithin | 1.93 gm |
| Total | 122.04 gm |

These ingredients are mixed and then cooked to 265° F. to 270° F. or until the syrup has about a 4.5% moisture content. At this time, 16 grams of peanuts are added to the mixture. The entire mixture is then allowed to cool in a mold, and is packaged.

As in the previous Example, the packaged candy bar is preferably merchandised in a carton together with a microwavable bag containing 56 grams of popcorn kernels and 11 grams of Centracote 105° F. hydrogenated soybean oil. This particular formulation makes a delicious caramel coated popcorn confection. As in the preceding Example, the amount of candy coating may be adjusted downward, for use with a smaller amount of popped popcorn, by reducing the amount of oil to 9 grams. A candy bar produced with this reduced amount of oil would be suitable, for example, for use with a microwavable bag containing 45 grams of popcorn kernels rather than 56 grams.

EXAMPLE VI

Milk Caramel Coated Popcorn

This example describes a formulation for a milk caramel flavor candy bar. The ingredients and quantities used are as follows:

| Ingredients | |
|---|---|
| Light Brown Sugar | 31.92 gm |
| Corn Syrup, 52 D.E., 43 Be', 81.5% TS | 44.38 gm |
| Coconut Oil, 92° F. m.p. | 18.30 gm |
| Baker's Butter | 1.95 gm |
| Salt | 1.17 gm |
| Sweetened Condensed Milk | 14.01 gm |
| Staley M. Lecithin | 1.56 m |
| Total | 113.36 gm |

These ingredients were mixed and then cooked at 265° F. to 270° F. or until the syrup has about 4.5% moisture content. The mixture was then poured into a mold and allowed to cool. When cooled, the resultant candy bar is packaged.

As in the two preceding Examples, the candy bar may be packaged in a carton together with a microwavable bag containing 56 grams of popcorn kernels and 11 grams of hydrogenated soybean oil, melting point 105° F. Similarly, again, to accommodate the candy bar as a coating to a smaller amount of popped corn, the amount of oil may be reduced to 9 grams without changing the amounts of the other ingredients in the candy coating, and the weight of popcorn kernels in the microwavable bag may be reduced to 45 grams.

When processed to make milk caramel coated popcorn, the product is a delicious snack.

EXAMPLE VII

Caramel Candy Coating Syrup at 2% Moisture

A study was made of the effect of moisture content of the candy bar syrup, on what can be termed the stickiness or tendency to block of popcorn coated with the syrup, after the coated popcorn had been finally subjected to microwave energy. The Table below reports the ingredients used in making the candy bar syrup, and the composition of the syrup coating at a 2% moisture level.

| | Ingredients Used, %, As Is Basis | Finished Syrup At 2% Moisture, % Based on Total Solids Content |
|---|---|---|
| Granulated Sugar | 35.15 | 39.30 |
| Corn Syrup 52 D.E., 43 Be', 81.5% TS | 39.55 | 36.00 |
| Molasses, 80% TS | 6.23 | 5.67 |
| Salt | 0.74 | 0.82 |
| Corn Oil | 12.81 | 14.40 |
| Lecithin | 1.61 | 1.81 |
| Water | 3.91 | 2.00 |
| Total | 100.00 | 100.00 |

To make a candy bar syrup from the ingredients reported above, the mixture of the ingredients was cooked to 300° F. At 30"±0.5" barometric pressure, a 2% by weight moisture content was observed. At that point the syrup was mixed with popcorn to form a coating on the popcorn. An examination of the popcorn and of the coating indicated that the average moisture content of the coating was about 2% by weight.

Several samples of the product were taken for storage evaluation purposes. One group of samples was stored at 70° F., another at 80° F., another at 90° F., another at 100° F., and still another at 110° F. After seven days of storage, these samples exhibited no tendency to block or agglomerate at storage temperatures of 100° F. and lower. At temperatures approaching 110° F. and above, some agglomeration was observed in some of the samples.

When this procedure was repeated at 3% moisture content of the coating, some of the samples exhibited blocking after seven days of storage at 70° F. At 90° F., some blocking was observed in almost all of the sets of samples. Further evaluations indicated that as the moisture content of the coated product increased, the extent of blocking increased during storage. This series of experiments is believed to demonstrate that the moisture content of the coating should be 2% or less, from the standpoint of keeping the product free flowing and free from blocking.

Further evaluation of the coated popcorn product, following final microwave treatment, indicated that for acceptable coating appearance and texture, a moisture content of the coating of about 1.40% or slightly less, as well as higher moisture contents, were acceptable. When the moisture content of the coating was appreciably below 1.40%, the coating had an appearance of being slightly scorched and the texture of the product suggested that it had been slightly burned. As the moisture content of the coating increased above 2%, the appearance of the coating remained acceptable but the texture became first chewy as the moisture content increased to about 2.5%, and then chewy and gummy at a moisture content of about 3%. At a moisture content of about 3.5%, the coating appearance remained acceptable, but was chewy and sufficiently gummy to be reminiscent of soft candy.

The data thus indicate that from the standpoints of coating appearance and texture, as well as freedom from agglomeration, a moisture content in the coating of about 2.0% is optimum, at least for caramel type coatings.

EXAMPLE VIII

The Effect of the Shortening Content on the Properties of the Candy Bar

Several experiments were performed in order to compare the effect of different amounts of corn oil in the ingredients used, on the final properties of the candy bar. The several different ingredient formulations employed are reported in the Table below. Each ingredient list reported is on an as is basis expressed as a percentage. The percentage refers to the percentage of the individual ingredient based on the total weight of all ingredients, as is.

In each case, the mixed ingredients were cooked to 300° F. Water was then added to adjust the final moisture content of the cooked syrup to be in the range from 4% to 5% by weight of the syrup. The cooked syrup, adjusted in moisture content, was then cast in candy bars of about 104 grams each

| Evaluation of the Effect of the Shortening Content of the Candy Bar | | | | | |
|---|---|---|---|---|---|
| | Exp. 8-1 % | Exp. 8-2 % | Exp. 8-3 % | Exp. 8-4 % | Exp. 8-5 % |
| Granulated Sugar | 40.31 | 38.42 | 36.58 | 34.63 | 32.65 |
| Corn Syrup 52 D.E. | 45.36 | 43.24 | 41.16 | 38.97 | 36.75 |
| Molasses | 7.14 | 6.81 | 6.48 | 6.14 | 5.79 |
| Salt | 0.84 | 0.80 | 0.77 | 0.73 | 0.68 |
| Corn Oil (Shortening) | 4.50 | 8.97 | 13.34 | 17.96 | 22.64 |
| Lecithin | 1.85 | 1.76 | 1.67 | 1.57 | 1.49 |

Notes:
1. All formulas were on wet basis, and expressed as percent.
2. Mixed syrup was cooked to 300° F. Water was added to adjust the final moisture to 4% to 5%.
3. At final moisture of 4.5%, Exp. 8-1 contained 5% shortening, Exp. 8-2 contained 10% shortening, Exp. 8-3 contained 15% shortening, Exp. 8-4 contained 20% shortening, and Exp. 8-5 contained 25% shortening.

At a final moisture content of 4.5% by weight of the cooked syrup, the candy bar produced in Experiment 8-1 contained 5% shortening by weight; in Experiment 8-2, 10% shortening; in 8-3, 15% shortening; in 8-4 20%; and in Experiment 8-5, 25% shortening. These figures for shortening content are nominal, the actual values, as determined by analysis, being reported in the Table below. This Table also reports on an evaluation that was made of the appearance of the coating on popcorn coated with the melted candy bar, and on its taste and texture.

| | Different Oil Contents | | | | |
|---|---|---|---|---|---|
| | Exp. 8-1 % | Exp. 8-2 % | Exp. 8-3 % | Exp. 8-4 % | Exp. 8-5 % |
| Oil Content (Dry Basis) | 5.01 | 9.93 | 14.70 | 19.68 | 24.68 |
| Percent Moisture (Actual) | 4.54 | 4.30 | 4.51 | 4.84 | 4.30 |
| Coating Appearance | Spotty Burnt but Acceptable | Acceptable | Good Coating | Good Coating | Good Coating |
| Taste and Texture | Acceptable | Acceptable | Good | Good | Good |
| Percent Moisture on Sugar Solids Basis | 5.49 | 5.46 | 6.01 | 6.05 | 6.42 |

Dry basis as it applied to the oil content in the above Table, refers to a 2% moisture content of the candy bar. At 2% moisture there is 98% solids in the candy bar.

EXAMPLE IX

Effect of the Use of Different Syrups

Several candy bars were prepared using generally the same basic ingredients in the same proportions, as reported in the Table below. In each case the ingredients were mixed and cooked to 300° F. Water was then added to the cooked syrup to adjust the moisture content to 5.0% by weight. The cooked syrup, containing the added water, was then cast to form a hard, meltable candy bar.

The following Table reports the ingredients employed in the initial mixture, and the approximate content of the cooked syrup after the addition of water, which is the same as the composition of the finished candy bar. The Table also reports in tabular form the identities of the different syrups that were used in different runs.

| | Initial Ingredients %, As Is Basis | Finished Candy Bar, %, Total Solids Basis |
|---|---|---|
| Granulated Sugar | 32.65 | 33.64 |
| Corn Syrup | 36.75 | 30.82 |
| Molasses, 80% TS | 5.79 | 4.85 |
| Salt | 0.68 | 0.70 |
| Corn Oil (Shortening) | 22.64 | 23.44 |
| Lecithin | 1.49 | 1.55 |
| Water | — | 5.00 |

Note:
Exp. 9-1 42 D.E./43 Be' Corn Syrup
Exp. 9-2 52 D.E./43 Be' Corn Syrup, 81.5% TS
Exp. 9-3 62 D.E./43 Be' Corn Syrup
Exp. 9-4 High Fructose 90 Corn Syrup, 43 D.E./36.7 Be'
Exp. 9-5 High Fructose 50 Corn Syrup, 43 D.E./36.7 Be'
Exp. 9-6 High Maltose Corn Syrup, 42 D.E./43 Be'

The results of these several experiments indicated that all of the candy bars, and the coated popcorn subsequently produced using these candy bars, were acceptable. The type of corn syrup employed did not appear to effect the melting characteristics of the candy bars during microwave heating. It was noted that candy bars made using high fructose corn syrup tended to be somewhat softer than those made using other types of corn syrup, and appeared to be thermoplastically deformed at room temperature after three or four days. Popcorn coated with a candy coating made using a high fructose corn syrup exhibited a slightly chewy mouth feel.

Higher D.E. corn syrups are more fully converted than lower D.E. corn syrups, and hence are sweeter. Thus the D.E. of the corn syrup used has a direct effect on sweetness, firmness, and the hygroscopicity of the candy bar, and, as well, of the coating on the popcorn. A taste panel testing of these several different coated popcorns indicated that the sweetness and crispness of popcorn coated with 52 D.E. corn syrup were superior to those popcorn coated with either at 42 D.E. corn syrup or a 62 D.E. corn syrup.

EXAMPLE X

Candy Coatings Having Different Flavors

Four differently flavored candy bars were prepared from different ingredients in order to produce bars having different flavors. The ingredients employed are reported in the following Table, which identifies them and the weight proportions used. The weight percentages reported are on an as is basis.

|  | Milk Caramel Flavor % | Coconut Flavor % | Granola Flavor % | Butter-Crunch Flavor % |
|---|---|---|---|---|
| Granulated Sugar | — | — | — | 33.81 |
| Light Brown Sugar | 24.17 | 17.43 | 25.53 | — |
| Corn Syrup 52 D.E., 43 Be', 81.5% TS | 33.16 | 33.12 | 35.49 | 33.67 |
| Salt | 0.88 | 0.29 | 0.93 | 0.75 |
| Coconut Oil 92° F. m.p. | 13.86 | 9.30 | 14.63 | 8.38 |
| Baker's Butter | 1.48 | 1.45 | 1.56 | 8.36 |
| Lecithin | 1.18 | 0.58 | 1.25 | 1.50 |
| Sweetened Cond. Milk | 15.92 | — | 11.21 | — |
| Cream of Coconut | — | 29.06 | — | — |
| Water | 8.90 | 8.77 | 9.40 | 9.09 |
| Sweet Whey | — | — | — | 4.03 |
| Natural Butter Flavor | — | — | — | 0.37 |
| Natural Annatto #6 Color | — | — | — | 0.04 |

In making these four different flavored candy coatings, the ingredients were mixed together, heated to achieve an approximately 4.5% moisture content, then cast into bars. The bars were meltable and once melted were easily mixed with popcorn to form good coatings. Optionally, peanuts, or sesame seeds and sunflower seeds may be added to the any of the flavor mixtures after cooking.

As somewhat similar procedure was followed to make three additional differently flavored candy bars, as reported below. In these three cases, however, the ingredients reported were cooked to about 4% to 5% moisture content. Thereafter, the flavoring material was added. Thus, the honey, maple syrup, maple flavor, peanut butter, and peanut flavor were added after the syrup had otherwise been cooked. The ingredients used are reported in the following Table:

|  | Ingredients | | |
|---|---|---|---|
|  | Honey Flavor | Maple Flavor | Peanut Butter Flavor |
| Light Brown Sugar | 35.05 | 30.84 | 30.91 |
| Corn Syrup 52 D.E. | 39.18 | 34.47 | 35.24 |
| Salt | 0.34 | 0.60 | 0.93 |
| Coconut Oil 92° F. | 16.15 | 14.21 | — |
| Baker's Butter | 1.72 | 1.51 | 1.56 |
| Sweetened Cond. Milk | — | 3.63 | 7.42 |
| Lecithin | 1.37 | 1.21 | 1.24 |
| Water | — | 4.54 | — |
| Honey, 80% TS | 6.19 | — | — |
| Maple Syrup, 67% TS | — | 8.16 | — |
| Natural Maple Flavor | — | 0.83 | — |
| Peanut Butter | — | — | 21.94 |
| Natural Peanut Flavor | — | — | 0.77 |

The candy bars produced with these three flavors melted readily and the coated popcorn produced with them, adjusted to 2% moisture content, had excellent texture, good appearance, and good flavor.

CONCLUSIONS

The foregoing examples are intended to demonstrate some of the preferred embodiments of the invention. While the candy bar is intended primarily for use with popcorn, packaging the candy in solid but meltable form has several advantages over preparing and shipping a similar material as a liquid. For example, any of the candy bars described above, after melting, make delicious toppings for puddings and cake.

The flavors of the candy bars in the examples are intended to be illustrative only. Slight adjustments in the list of ingredients permit the candy to be made up of flavors like honey, butterscotch, toffee, and malt.

An alternative embodiment of the present invention calls for the initial popping of the popcorn kernels in oil in a microwave oven; the transfer of the popped corn to a microwave penetrable bowl; and placement of a candy bar and peanuts on top of the popped corn. The peanuts are not incorporated into the candy bar as disclosed above. The popped corn, candy bar, and peanuts are then placed in the microwave oven for a sufficient time to melt the candy. After the candy has melted, the bowl of popcorn, candy melt, and peanuts are removed from the microwave oven and stirred to produce the desired candy coated popcorn product. This embodiment also differs from the practice of the invention where the peanuts are added after the candy has been melted over the popped corn.

An optional ingredient in any of the candy formulations is a gelling agent such as pectin. The amount of pectin added may be about 0.5% by weight. The pectin serves to hold the shape of the candy bar when subjected to environmental temperatures above about 80° F. (27° C.). A candy bar without pectin is thermoplastic and begins to lose its shape at a much faster rate than a candy bar with pectin, at ambient temperatures above about 80° F. Pectin slows the thermoplasticity rate of the candy bar, but does not nullify the thermoplastic characteristics. The addition of pectin to the candy formulation does not affect the melt characteristics of the candy when subjected to microwave energy.

While the invention has been disclosed by reference to the details of preferred embodiments, this disclosure is intended in an illustrative rather than in a limiting sense, as it is contemplated that modifications will readily occur to those skilled in the art, within the spirit of the invention and the scope of the appended claims.

What is claimed is:

1. A candy bar which displays uniform melting characteristics in a microwave oven and forms a pourable composition that is useful as a coating comprising
   a solidified emulsion of shortening, water, an edible emulsifying agent, and a sweetener selected from the group consisting of sugar, corn syrup, corn syrup solids, molasses, and mixtures thereof, said solidified emulsion having a substantially uniform thickness,
   the amount of moisture present in the bar being in the range from about 2% to about 10% of said bar by weight,
   the amount of emulsifying agent present being from about 1% to about 2% of said bar by weight and sufficient to inhibit the separation of said shortening as the fluid emulsion is cooled and hardened to form said bar, and
   the amount of shortening being from about 1% to about 30% of said bar by weight and sufficient to promote uniform melting of said candy bar.

2. The candy bar of claim 1 wherein said candy bar has a rectangular shape with the length being no greater than about two times the width.

3. The candy bar of claim 2 wherein the thickness of said candy bar is from about 0.25 inch to about 0.50 inch.

4. The candy bar of claim 3 wherein said candy bar has a water activity value from about 0.30 to about 0.60.

5. The candy bar of claim 4 wherein said sweetener comprises a mixture of sugar and corn syrup or corn syrup solids having a D.E. in the range from about 28 to about 68, in an amount sufficient to prevent sugar crystallization.

6. The candy bar of claim 4 wherein said shortening is a vegetable oil.

7. The candy bar of claim 6 wherein said shortening is corn oil.

8. The candy bar of claim 4 wherein said edible emulsifying agent is lecithin.

9. The candy bar of claim 5 wherein said sweetener comprises molasses.

10. A candy bar which displays uniform melting characteristics in a microwave oven and forms a pourable composition that is useful as a coating comprising
    a solidified emulsion of a sweetener selected from group consisting of sugar, sugar substitutes, corn syrup having a D.E. from about 28 to about 68, molasses, and mixtures thereof; vegetable oil; water; and lecithin as an edible emulsifying agent, said solidified emulsion having a substantially uniform thickness,
    the amount of moisture present in the bar being in the range from about 4% to about 5% by weight of said bar,
    the amount of lecithin present being from about 1% to about 2% of said bar by weight and sufficient to inhibit the separation of said shortening as the fluid emulsion is cooled and hardened to form said bar, and
    the amount of vegetable oil being from about 1% to about 30% of said bar by weight and sufficient to promote uniform melting of said candy bar.

11. The candy bar of claim 10 wherein said candy bar has a rectangular shape with the length being no greater than about two times the width.

12. The candy bar of claim 11 wherein the thickness of said candy bar is from about 0.25 inch to about 0.50 inch.

13. The candy bar of claim 12 wherein said candy bar has a water activity value from about 0.30 to about 0.60.

14. The candy bar of claim 13 characterized by a caramel flavor.

15. The candy bar of claim 3 further comprising a gelling agent in sufficient amount to slow the thermoplasticity rate of said candy bar at ambient temperatures above 80° F.

16. The candy bar of claim 13 wherein said sweetener is a sugar substitute.

17. The candy bar of claim 16 wherein said sugar substitute is aspartame.

* * * * *